INVENTOR
Edward Stanley Robbins

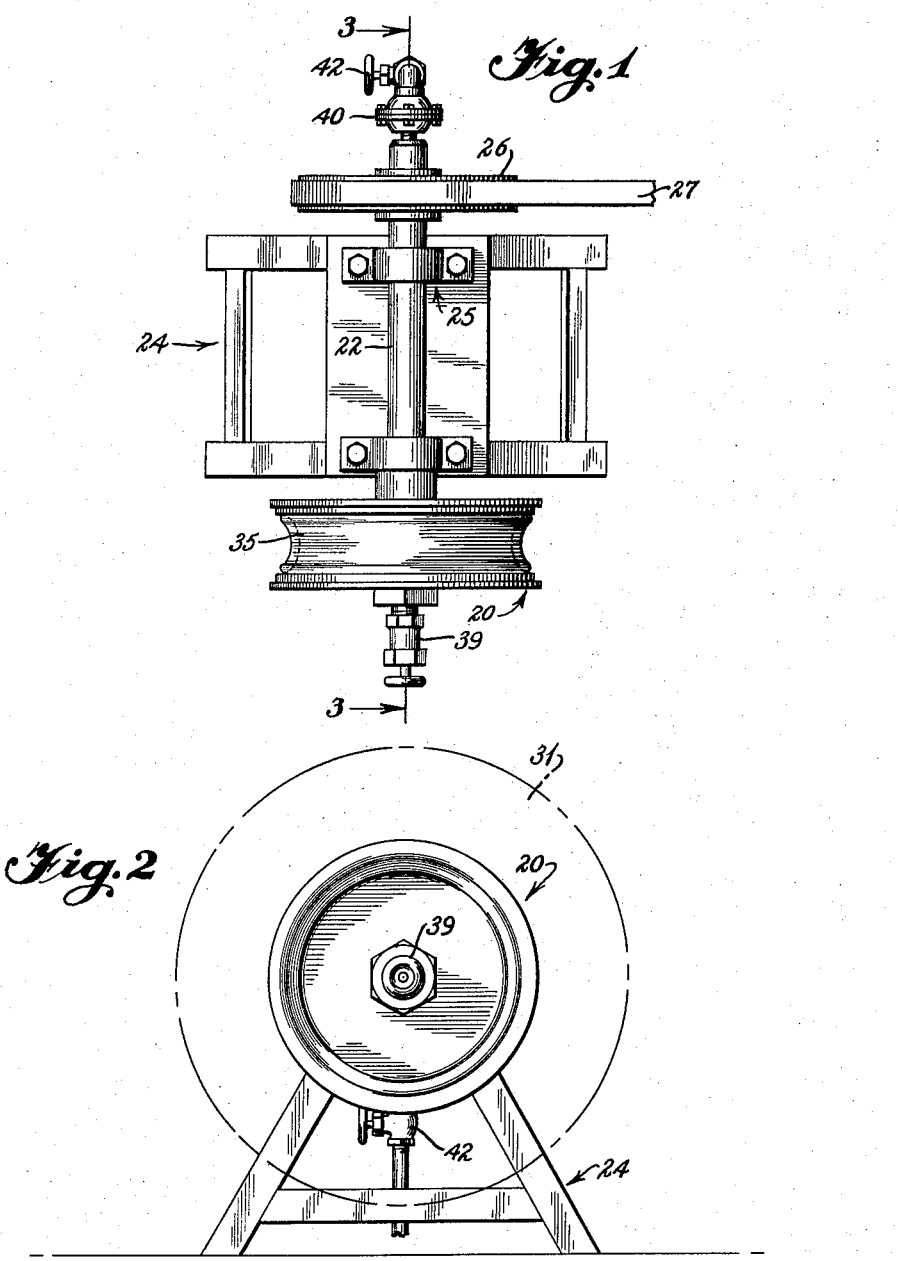

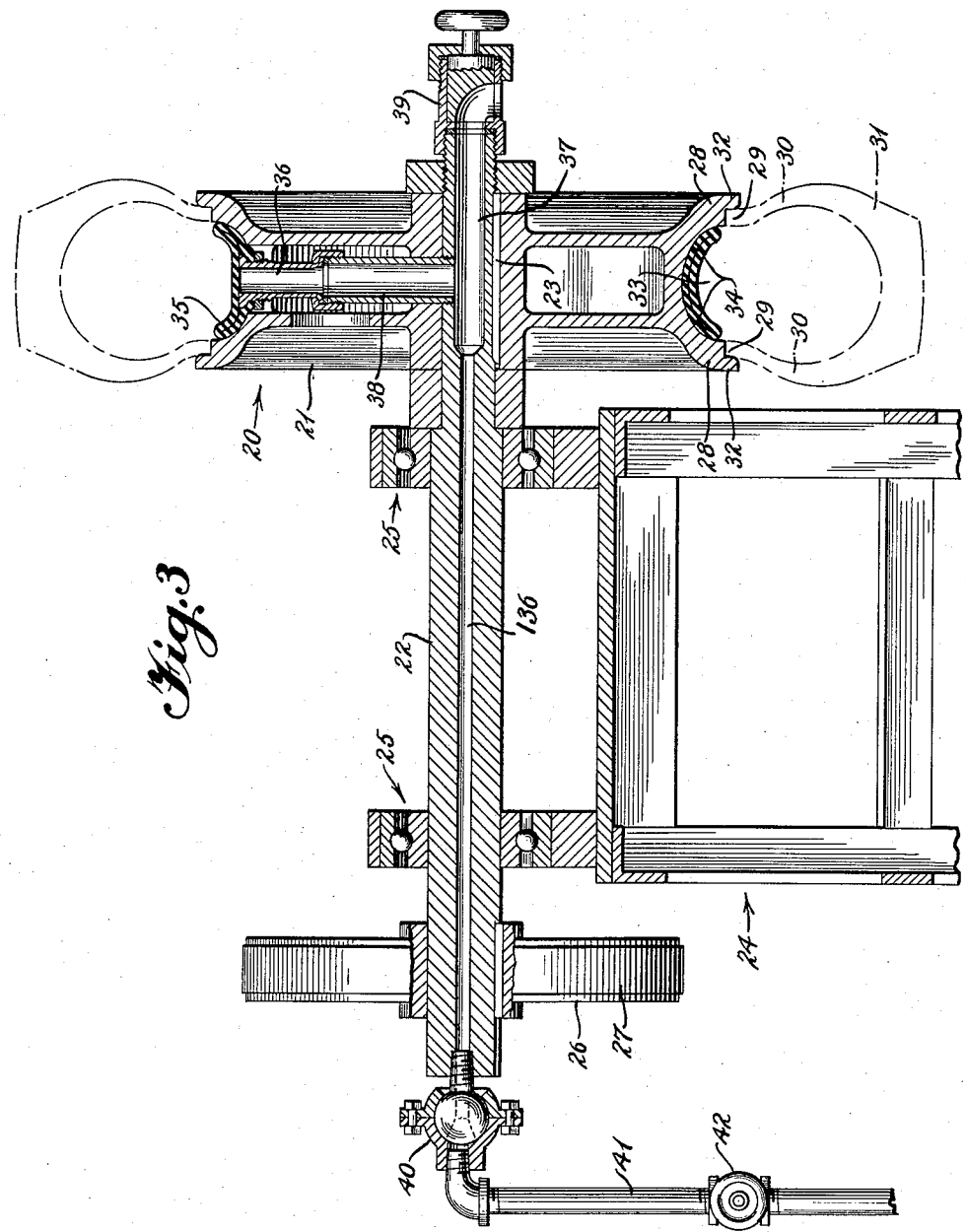

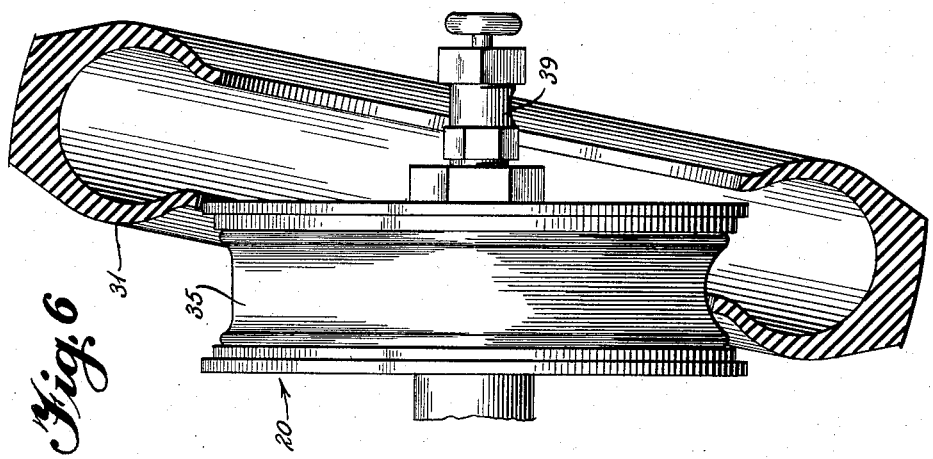
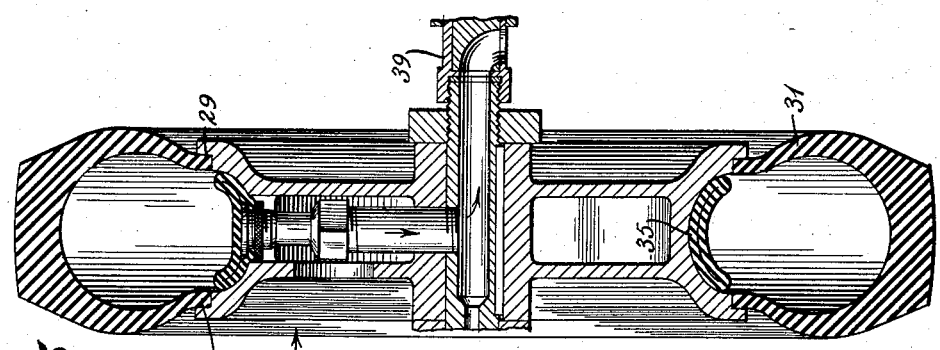
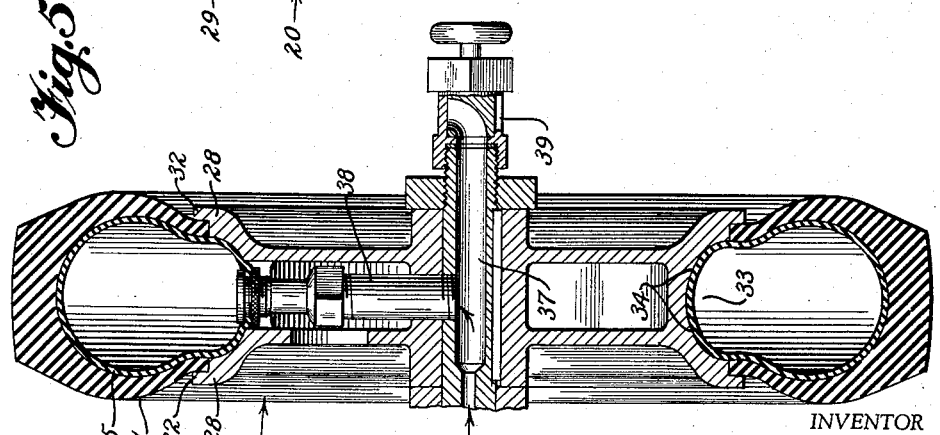

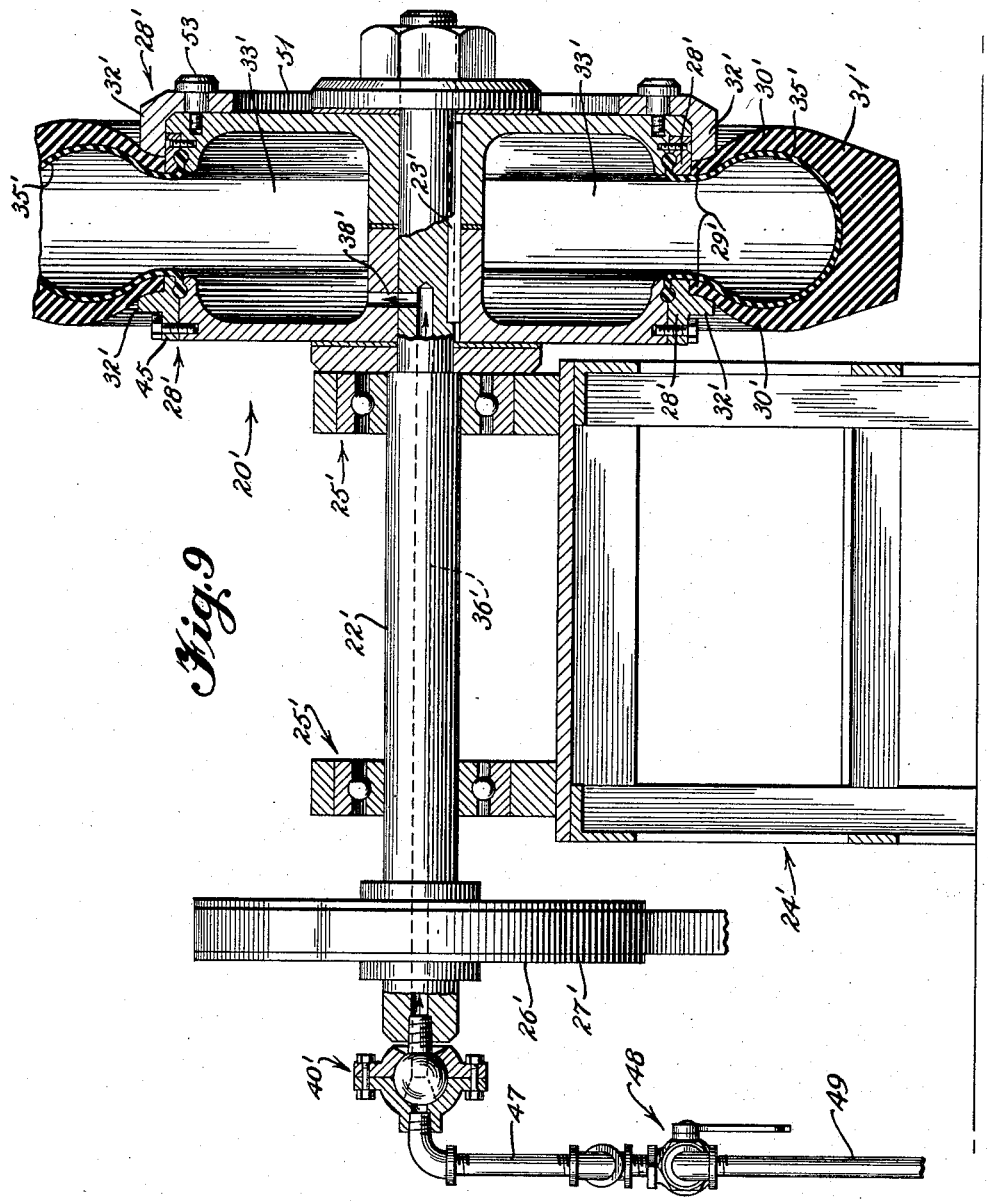
INVENTOR
*Edward Stanley Robbins*
BY *Beale and Jones*
ATTORNEYS

Feb. 9, 1960 E. S. ROBBINS 2,924,255
EXPANSIBLE TIRE CHUCK
Filed Oct. 25, 1955 6 Sheets-Sheet 6
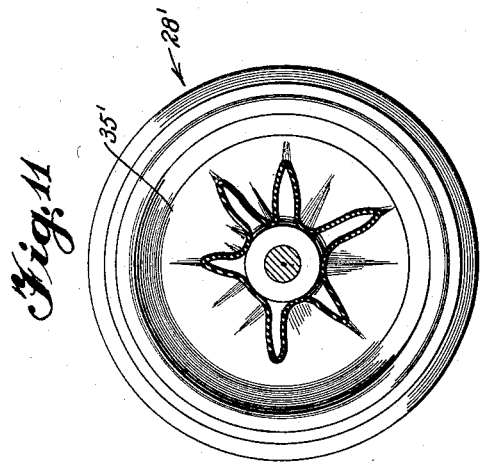
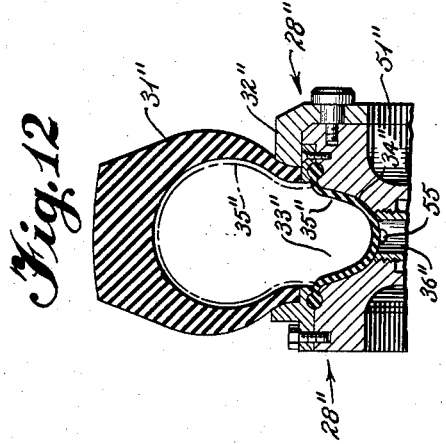
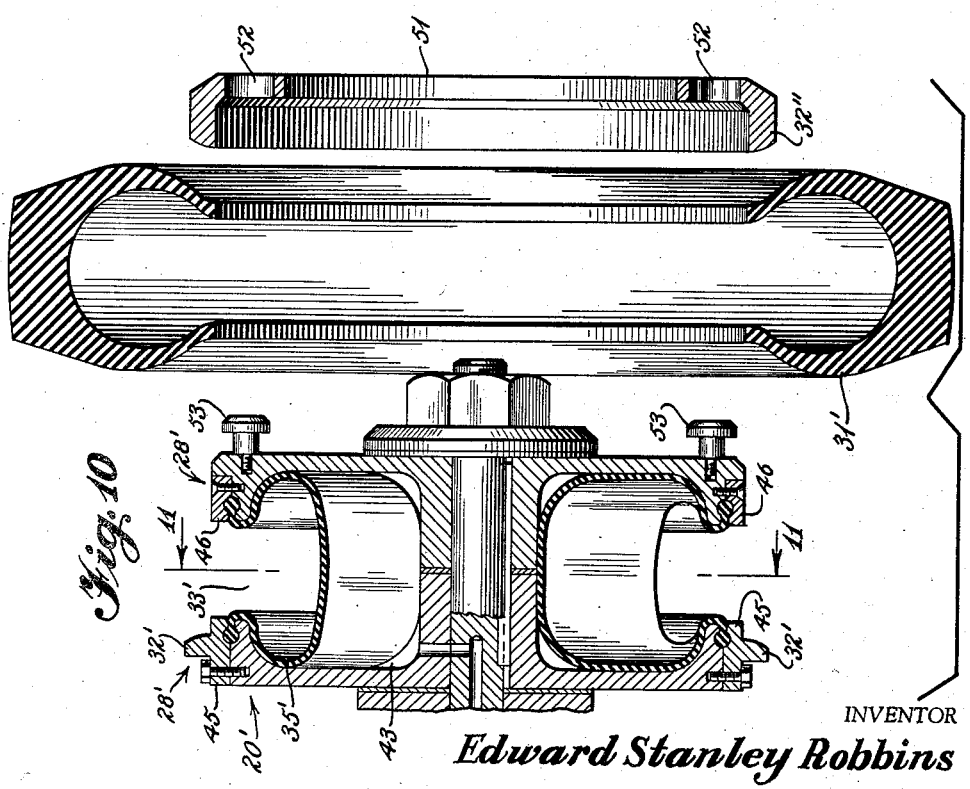
INVENTOR
Edward Stanley Robbins
BY
ATTORNEYS

United States Patent Office 2,924,255
Patented Feb. 9, 1960

2,924,255

EXPANSIBLE TIRE CHUCK

Edward Stanley Robbins, Killen, Ala., assignor, by mesne assignments, to Robbins Tire and Rubber Company Inc., Tuscumbia, Ala., a corporation of Alabama Application October 25, 1955, Serial No. 542,553

3 Claims. (Cl. 144—288)

This invention relates to means for rotatably mounting a tire for working on it. More specifically, it refers to an expansible tire chuck for quickly and accurately mounting a tire on a lathe or the like so that it may be rotated for abrading purposes, or for removing part of the old rubber and roughing up the tire carcass in preparation for recapping.

Due to the increase in vehicle speeds on the highways and to increases in the sizes of tires it has become more and more important during the past few years that automobile tires have perfectly circular surfaces about the center of rotation, with the minimum possible out-of-round condition. In recapping of tires it is very important that the tire casing be fixed to its chuck in as perfectly true a position as possible. The work of removing part of the old rubber and roughing up the tire carcass should be done in a manner similar to the turning of a wheel on a lathe. The chuck should be a precision-machined wheel with support surfaces which position the tire casing in a correctly centered and perfectly true position. The chuck means should be such as to insure that the casing will be held in a true position throughout the operation. For economical use of the apparatus means should be provided for placing a tire casing on the chuck quickly, and for easily and quickly removing it. During the abrading operation the tire should be rotated at a speed approximating the rotary speed of the tire on a vehicle traveling at high speed.

It is an object of this invention to provide a tire chuck which will meet the above requirements. Another object is to provide an expansible tire chuck comprising a rotatably mounted wheel, a tire supporting rim on said wheel, and an expansible fluid chamber disposed in said rim and having an annular flexible wall which may be forced outwardly into a casing disposed on said rim for holding it firmly and accurately thereon, and which may be withdrawn inwardly completely out of said casing to permit the ready removal of the casing from the rim. Another object is to provide suitable means for supplying fluid under pressure to said expansible chamber for quickly chucking a tire casing, and suitable means for removing fluid from said chamber quickly to withdraw said wall from said tire casing so as to permit the prompt removal of said tire casing after the work thereon has been completed. Another object is to provide means for supplying air or other fluid to said chamber and removing it therefrom while said tire casing is being rotated, in order to speed up the chucking and unchucking of said tire casing.

An expansible tire chuck with a flexible wall such as described above may be provided in several ways. In one embodiment, the flexible wall is an annular diaphragm extending around the wheel over a recess between a pair of rim portions and secured to said rim portions. This diaphragm surrounds an expansible fluid chamber. Fluid under pressure may be supplied to this chamber to force the diaphragm outwardly into a tire casing disposed on said rim portions. Means are also provided to apply suction to said chamber to withdraw the flexible wall or diaphragm into the ring recess, for removal of one tire casing and placement of another tire casing on the rim. Another embodiment is similar but a highly elastic annular diaphragm is used. In this form the elasticity of the diaphragm is sufficient to expel fluid from the chamber, so that suction means is not required.

In still another embodiment, an expansible tube is disposed in a recess between rim portions of the chuck. The tube in its relaxed state has a smaller diameter and circumference than that of the annular depression between the rim portions of the chuck. The tube is stretched over the wheel between the rim portions while it is exhausted. It, therefore, forcibly ejects fluid whenever a discharge duct from the tube is opened. Air or other suitable fluid is forced into the tube to expand it outwardly into the tire casing to chuck said casing accurately and quickly on said wheel. To release the tire casing, it is only necessary to release the fluid by opening a suitable valve, whereupon the flexible, resilient tube itself expels the fluid.

Although it is old to use an inner tube or an air bag resembling an inner tube within a tire casing for buffing operations or the like, the operation of placing such an air bag in a casing, then placing the tire and casing on a rotatable wheel for a buffing operation or the like, then removing the tire casing with its inner tube or air bag from the wheel, and removing the air bag is a slow operation. So far as is known, means such as disclosed in this application have not heretofore been provided for quick insertion of an air bag in a tire casing nor for quick removal thereof.

Other objects and advantages of the present invention will be apparent from the following description and an examination of the appended drawings, wherein:

Figure 1 is a plan view showing a preferred form of my invention;

Figure 2 is a front elevation of the same, showing in broken lines the outline of the tire casing as disposed thereon in operative position;

Figure 3 is a vertical section taken on line 3—3 of Figure 1, shown at an enlarged scale, the cross-section of a tire casing disposed thereon being shown in broken lines;

Figure 4 is a fragmentary vertical section similar to that of the righthand portion of Figure 3 showing the expansible tube fully expanded into a tire casing disposed on the wheel;

Figure 5 is a view similar to Figure 4 showing the tube exhausted and lying inwardly of the inner edges of the sidewalls of the superimposed tire casing disposed on said wheel;

Figure 6 is a side elevation similar to the sectional view of Figure 5 showing the tube shrunk onto the wheel rim and the tire casing in section in an intermediate position for placement of said tire on the wheel or removal of the tire therefrom;

Figure 9 is a vertical section to enlarged scale taken on line 9—9 of Figure 7;

Figure 10 is a fragmentary partially exploded view of the righthand portion of Figure 9 showing the tire casing and a detachable rim portion removed;

Figure 11 is a section taken on line 11—11 of Fig. 10, shown to reduced scale;

Figure 12 is a fragmentary sectional view similar to Figures 3 and 9, but showing still another embodiment of my invention.

Figure 7:
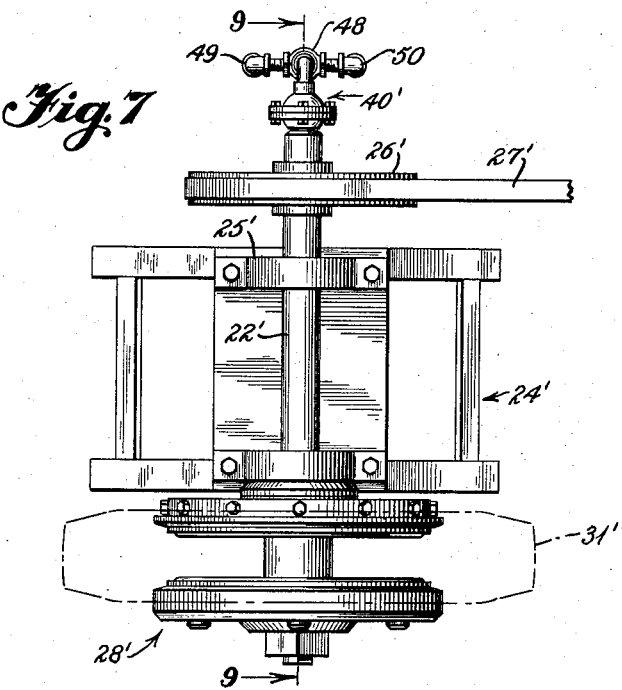
Figure 7 is a plan view of another embodiment of my invention showing a tire casing disposed thereon in broken lines.

Referring now to the drawings, in which like characters indicate similar parts, Figures 1-6 show the preferred embodiment of my invention comprising a wheel 20, having a rim 21, mounted on a rotatable shaft 22, wheel 20 being fixed to shaft 22 for rotation therewith by suitable means, such as a key 23. Shaft 22 is rotatably mounted on a stand 24 by suitable bearings 25. Fixed to the shaft 22 is a pulley 26 by means of which shaft 22 and wheel 20 may be rotated, a belt 27 being connected to power means not shown.

Rim 21 has a pair of rim portions 28 which are adapted to support the inner edges or portions 29 of the sidewalls 30 of a tire 31 disposed on the rim of wheel 20. Rim or side portions 28 have lateral side support portions 32 for supporting a portion of the outer surface of the respective sidewalls of the tire casing, to prevent tire portions 29 from being spread apart.

Between the annular rim or side portions 28 and inward radially of said side portions is an annular recess 33 having an inner wall surface 34.

Disposed in annular recess 33 and tightly stretched around the surface 34 thereof is an annular flexible and elastic tube or air bag 35. Tube 35 has a filling and exhaust tube 36 extending radially inwardly through a suitable aperture in rim 21 and connected to means which will be described below for expanding tube 35 and for releasing fluid such as compressed air therefrom. Tube 35 is preferably made of a very strong and tough, yet highly elastic rubber which will expand and return quickly to its original shape thousands of times when fluid pressure is forced into, and then released from the tube. By using a tube having a diameter and circumference in the relaxed condition less than that of the rim upon which it is fixed, the tube 35 quickly expels substantially all air or other fluid when a suitable release valve connected with the filling pipe is opened. The stronger and more elastic the tube 35 is, and the more it is stretched on the rim, the faster it will expel air from its interior, provided the exhaust passages are sufficiently large. For satisfactory results, tube 35 should have a circumference, when in the unstretched deflated condition off the rim, less than 90% of the minimum circumference of the annular surface 34 upon which it is stretched. Preferably, the circumference of tube 35 in the unstretched condition described should be less than 75% of the minimum circumference of the depressed portion of the rim.

As shown in Figures 3, 5, and 6, wherein tube 35 is in the exhausted condition, it lies wholly within annular recess 33 below or radially inwardly of the inner edge portions 29 of a tire casing 31 disposed on the wheel. This makes it easy to place the tire casing on the rim or to remove it therefrom as illustrated in Figure 6, in the same manner that a tire is applied and mounted on a drop center wheel or rim of conventional design.

Figure 4 shows tube 35 expanded within the tire casing 31 disposed on wheel 20. In this condition, tube 35 presses firmly against the tire casing and against the rim portions 34 of the wheel and holds tire casing 31 securely and firmly on said wheel in an accurately trued position. It is held securely in this position during rotation of wheel 20 and buffing or other operation on casing 21.

Suitable means are provided for supplying fluid to, and exhausting fluid from tube 35, as best illustrated in Figure 3. A duct 136 extends throughout the length of a shaft 22. The end of duct 36 adjacent wheel 20 is enlarged as indicated at 37. An enlarged duct 38 connects portion 37 with filling tube 135 of tube 35. A quick release valve 39 is attached to the end of shaft 22 adjacent wheel 20. By turning the knob of valve 39 from the closed to the opened position an exit passage of large cross-section is provided from tube 35 through tubes 36, 38, and 37, so that tube 35 may be exhausted quickly when valve 39 is opened. If preferred, a quick release valve of the reciprocating type may be used so that the fluid can be released before the wheel has stopped rotating, by simply pressing the valve stem inwardly along the axis of shaft 22.

Connected with the end of duct 136 opposite valve 39 is a rotatable joint 40 connecting duct 36 with a supply pipe 41 leading from a source of fluid under pressure, such as compressed air. A stop valve 42 in line 41 provides means by which fluid may be admitted to tube 35 through joint 40, duct 136—37, and duct 38—36. Because of rotary joint 40, the fluid under pressure may be supplied to tube 35 while the wheel 20 is being rotated.

The operation of the apparatus shown in Figures 1-6 will be apparent from the above description. With wheel 20 stationary, valve 42 closed, and valve 39 opened as shown in Figure 5, tube 35 will lie within recess 33 in the position illustrated in Figures 3, 5, and 6. A casing 31 to be retreaded may be placed on wheel 20 in the manner illustrated in Figure 6 and disposed on rim 21 of wheel 20 as illustrated in Figure 5. Valve 39 is then closed as shown in Figure 4 and valve 42 opened, admitting fluid under pressure to tube 35 and expanding it outwardly until it fills the casing 31 as illustrated in Figure 4. Wheel 20 with casing 31 thereon may then be rotated by means 26—27 previously described. On completion of the buffing or other operation on casing 31 valve 42 is closed, wheel 20 is stopped, and valve 39 opened. The elastic tube 35 thereupon expels the fluid from itself through ducts 36—38—37 and valve 39 so that tube 35 again assumes the position within the depressed portion of wheel 20 illustrated in Figures 3, 5, and 6. The casing 31 is then removed in the manner illustrated in Figure 6.

Another embodiment of my invention is shown in Figures 7-11, inclusive. Referring more particularly to Figure 9, a wheel 20' is mounted on a shaft 22', being fixed thereto for rotation therewith by a key 23'. Shaft 22' is rotatably mounted on a stand 24' by suitable bearings 25'. A pulley 26' fixed to shaft 22', and a belt 27', around pulley 26' and leading from a motor not shown, provide means for rotating shaft 22' and wheel 20'. Wheel 20' has a pair of rim portions 28'—28' adapted to support the inner edge portions 29' of the sidewalls 30' of a tire 31'. Rim portions 28' each have a lateral side support portion 32' for supporting a portion of the outer surface of the respective sidewall adjacent the inner edge portion 29' thereof. A comparatively large annular recess 33' is provided in wheel 20' between rim portions 28' and extending inwardly therefrom toward shaft 22'.

A flexible, annular diaphragm 35' extends around wheel 20' between rim portions 28' and attached thereto by ring portions 45 and 46, respectively, of rim portions 28'.

The annular space between diaphragm 35' and the walls 34' of recess 33' constitutes an expansible fluid chamber and the diaphragm functions as an air bag. Means, to be described below, are provided for supplying fluid under pressure to this expansible chamber to expand it and thereby force flexible wall 35' outwardly into tire casing 31' as illustrated in Figure 9, and to withdraw the fluid from said chamber to exhaust it and thereby withdraw flexible wall 35' inwardly into recess 33' as illustrated in Figures 10 and 11.

Flexible wall or diaphragm 35' may be of elastic, highly extensible rubber with enough stretch and elasticity so that, when sufficient fluid pressure is applied to said expansible fluid chamber wall or diaphragm 35', it will expand elastically outwardly against the inner surfaces of tire casing 31' and, when said fluid is sufficiently exhausted from said expansible fluid chamber, flexible wall 35' will be drawn within annular recess 33', substantially to the position shown in Figures 10 and 11. It is not necessary, however, that wall or diaphragm 35' be of highly elastic material. Instead, it may be made of a flexible material which has just sufficient stretch and elasticity so that it will conform well to the interior surfaces of tire casing 31' when said expansible fluid chamber is fully expanded. No matter which type of material is used for flexible wall or diaphragm 35', when it is forced outwardly into a tire casing 31' disposed on wheel 20', it chucks said tire casing on wheel 20' very firmly and precisely.

As stated above, means are provided for supplying fluid under pressure to the annular expansible fluid chamber, and for withdrawing it therefrom. A fluid duct 36' in shaft 22' connects with a duct 38' leading to recess 33'. Duct 36' is connected with a supply and exhaust pipe 47 by a rotatable joint 40'. Supply and exhaust pipe 47 may be connected with a source of fluid under pressure (not shown) through a supply pipe 49 (Figure 7), or with suction means (not shown) as through a suction pipe 50, by a three-way valve 48, these connections being indicated in Figure 7. Valve 48 may be thrown in one position to connect pipe 47 with the source of fluid under pressure through pipe 49; it may be thrown in position to connect pipe 47 with vacuum pipe 50; or, it may be thrown in a third position to disconnect pipe 47 from both pipe 49 and pipe 50.

Figure 8:
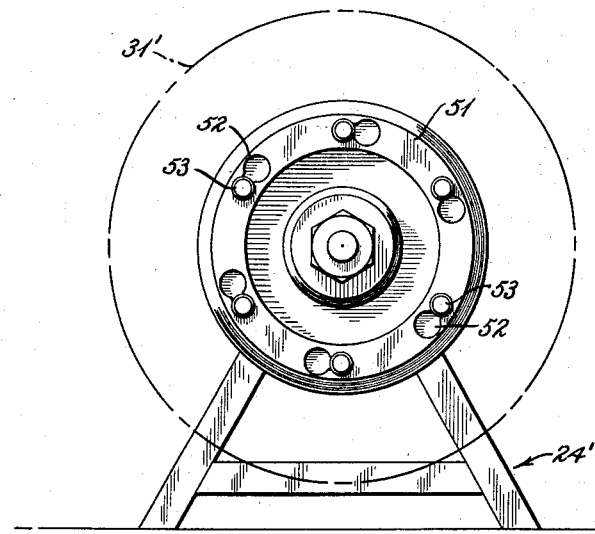
Figure 8 is a front elevation of the same.

Referring to Figure 9, the lefthand rim portion 28' has a lateral side support 32' which remains in fixed position during the use of the apparatus to support a portion of the outer surface of the lefthand sidewall of tire casing 31'. The righthand rim portion 28' has a quickly detachable lateral side support 32' for supporting a portion of the outer side of the righthand sidewalls of tire 31'. The structure of this detachable side support 32' and the means for quickly attaching and detaching it is best understood by reference to Figures 8 and 10. The detachable side support 32' is part of a ring 51 having a flat flange portion which has a plurality of keyhole slots 52 therethrough. The enlarged portions of keyhole slots 52 are big enough to pass the heads of turnbolts 53 which are screwed in the righthand side of wheel 20' as viewed in Figure 10. Referring to Figure 8, turn-bolts 53 may be loosened slightly, ring 51 rotated counterclockwise, and ring 51 withdrawn from the wheel as illustrated in Figure 10. Flexible wall or diaphragm 35' being withdrawn within recess 33' it is very easy to place a tire casing 31' on wheel 20' or remove it therefrom.

From the foregoing description the operation of the apparatus shown in Figures 7 to 11 will be apparent. With the tire casing in place on wheel 20' and ring 51 in place, valve 48 is turned to admit fluid under pressure to expansible chamber 43 to force flexible wall 35' outwardly into the tire casing to the position illustrated in Figure 9. The wheel is rotated by means 26'—27', for abrading casing 31'. The wheel is then stopped and valve 48 turned to the position to exhaust fluid from chamber 43 so as to withdraw flexible wall 35' to the position illustrated to Figure 10. Ring 51 and tire 31' may then be removed and the operation repeated on another tire.

Figure 12 shows still another embodiment of my invention. An annular diaphragm 35" of strong, tough, highly elastic rubber is stretched tightly around the inner surface 34" of annular recess 33", which lies between rim portions 28". The edges of diaphragm 35" are firmly attached to rim portions 28" in a manner like that described for the embodiment of Figures 7-11. There is a detachable portion 32"—51", like that of Figures 7-11, although this is not necessary; the rim may, instead, be of the drop center type shown in Figures 3-6, modified to provide means for attaching the edges of diaphragm 35" to the inner sides of rim portions 28". Diaphragm 35" thus forms an annular expansible chamber between itself and the surface 34". A duct 36" leads inwardly from recess 33" and connects with a duct like those shown in Figure 3 at 38, 37, and 36. The embodiment of Figure 12 is like that of Figure 3 inwardly of the rim, including release valve 39, compressed fluid supply means 40, 41 and 42, and the mounting and wheel turning means. Thus, compressed air or other fluid may be admitted to the expansible chamber and released from it. Diaphragm 35" is shown in full lines in the position it takes when the fluid is released, and in broken lines in its expanded position inside a tire casing 31". Because it is stretched on the rim it expels fluid quickly when the release valve is opened. Suitable grooves may be provided in the surface 34" to facilitate the release of fluid from the expansible chamber terminating in openings into the exhaust duct, such as indicated at 55. For quick expelling action by diaphragm 35", its circumference in the unstretched condition off the rim should not exceed approximately 90% of the minimum circumference of surface 34", and best results are obtained when its unstretched circumference is somewhat less than 75% of the minimum circumference of surface 34".

The embodiment of Figure 12 is operated in the same manner as that described above for the apparatus of Figures 1-6, except for the detachable ring 51", which is operated in the manner described above for the embodiment of Figures 7-11. When fluid under pressure forces diaphragm 35" out into the tire casing the latter is quickly and accurately chucked on the wheel. When fluid is released, as by a release valve like valve 39, elastic diaphragm 35" expels the fluid and assumes a position below the tire casing, thereby permitting easy removal of the tire casing and placement of another tire casing on the wheel.

From the foregoing description, it will be apparent that I have provided a fluid-operated tire chuck by means of which a tire casing may be chucked on a lathe or the like very quickly and accurately and the tire removed from the lathe or chuck very easily and quickly. Furthermore, the tire casing is automatically forced into true position and held accurately in said position for abrading or other operation on said tire. In each form of my invention I provide an expansible fluid chamber having an annular flexible wall. In the preferred form, this chamber is the interior of a very strong, elastic, flexible tube. In the other forms described, the expansible fluid chamber is the annular space between an annular flexible wall or diaphragm and a recess in the wheel. In each form, an annular, flexible wall is provided. In the preferred form, this wall is a portion at least of the tube. In the other forms, the wall is the flexible diaphragm. In each form, the flexible wall is forced outwardly to chuck the tire accurately on the wheel rim and drawn inwardly (either by its own elasticity or by suction means) clear of the tire casing to permit removal of one tire casing and placement of another tire casing on the wheel.

Numerous other embodiments within the scope of the appended claims will be apparent to those skilled in the art. For example, and without limitation, the embodiment illustrated in Figures 1 to 6, inclusive, may be modified by substitution of a removable rim portion such as that shown at 32" in Figure 10 for the fixed portion 32 shown at the righthand side of Figure 3.

I claim:

1. A tire chuck for mounting a pneumatic tire casing comprising a rotatable wheel having a pair of opposed peripheral edges, rim members secured on said wheel around said peripheral edges, to support the respective side walls of a tire casing, said wheel having an annular recess between said rim members, a tubular inflatable air bag mounted in said recess in stretched condition radially inward on said wheel from said rim members, and duct means communicating with said air bag and disposed radially inwardly of said rim members for inflating and exhausting said air bag, said air bag being capable when inflated of expanding against a tire casing mounted on said wheel, and when exhausted being self-retracting because of its stretched condition.

2. A tire chuck for mounting a pneumatic tire casing comprising a rotatable wheel having a pair of opposed peripheral edges, rim members secured on said wheel around said peripheral edges to support the respective side walls of a tire casing, said wheel having an annular recess between said rim members, an annular inflatable air bag mounted in said recess in stretched condition radially inward on said wheel from said rim members, and duct means communicating with said air bag and disposed radially inwardly of said rim members for inflating and exhausting said air bag, said air bag when in exhausted and unstretched condition off said wheel having a diameter less than ninety percent of the diameter of said recess, said air bag being capable when inflated of expanding against a tire casing mounted on said wheel, and when exhausted being self-retracting because of its stretched condition.

3. A tire chuck for mounting a pneumatic tire casing comprising a rotatable shaft, a manifold duct extending axially of said shaft, a wheel having a pair of opposed peripheral edges and mounted on said shaft to rotate upon rotation of said shaft, a rim member secured on said wheel around each peripheral edge thereof to support the inner edges of the respective side walls of a tire casing, said wheel having an annular recess between said rim members, air bag means mounted in stretched condition on said wheel in said recess and between said rim members, said air bag means being capable when inflated of expanding against said tire casing and when exhausted being self-retracting to a position radially inward on said wheel from said rim members, a connecting duct extending radially through said wheel and interconnecting said manifold duct and said air bag means, means mounted at an end of said shaft at one side of said wheel to inject fluid under pressure into said manifold duct, said manifold duct being enlarged on the opposite side of said wheel, said connecting duct having a cross-sectional area approximately equal to the cross-sectional area of said enlarged manifold duct portion, and a quick-acting release valve mounted on said enlarged manifold duct.

References Cited in the file of this patent
UNITED STATES PATENTS

| | | |
|---|---|---|
| 1,685,297 | Shone | Sept. 25, 1928 |
| 1,777,405 | Frank | Oct. 7, 1930 |
| 2,045,937 | Woock | June 30, 1936 |
| 2,054,965 | Clo | Sept. 22, 1936 |
| 2,182,176 | Maranville | Dec. 5, 1939 |
| 2,479,493 | Horton-Wellings | Aug. 16, 1949 |
| 2,493,289 | Hawkinson | Jan. 3, 1950 |
| 2,514,964 | Miller et al. | July 11, 1950 |
| 2,728,105 | Pacciarini | Dec. 27, 1955 |